United States Patent [19]

Masaki et al.

[11] Patent Number: 4,572,617
[45] Date of Patent: Feb. 25, 1986

[54] ELECTROOPTICAL DEVICE HAVING THINNER LIQUID CRYSTAL LAYER IN DISPLAY PORTIONS

[75] Inventors: Yuichi Masaki, Kawasaki; Makoto Ogura, Hiratsuka, both of Japan

[73] Assignee: Canon Kabushiki Kaisha, Tokyo, Japan

[21] Appl. No.: 504,418

[22] Filed: Jun. 15, 1983

[30] Foreign Application Priority Data

Jun. 23, 1982 [JP] Japan ................ 57-107880
Jun. 25, 1982 [JP] Japan ................ 57-109367

[51] Int. Cl.⁴ ............................................. G02F 1/13
[52] U.S. Cl. .................... 350/339 R; 350/349; 350/346
[58] Field of Search ................ 350/349, 346, 339 R

[56] References Cited

U.S. PATENT DOCUMENTS 3,833,287  9/1974  Taylor et al. ............... 350/349
4,128,313 12/1978  Cole, Jr. et al. ........... 350/349 X
4,235,526 11/1980  Berman et al. ............. 350/349 X
4,387,965  6/1983  Hara ........................ 350/339 R X

*Primary Examiner*—John K. Corbin
*Assistant Examiner*—Richard F. Gallivan
*Attorney, Agent, or Firm*—Fitzpatrick, Cella, Harper & Scinto

[57] ABSTRACT

An electrooptical display device having, between a pair of electrode plates, a layer of a guest-host, dichroic dye-containing nematic liquid crystal having a positive dielectric anisotropy, wherein optical characteristics of the section of the liquid crystal layer laid between a pair of electrodes formed separately on the electrode plates are made substantially equal, when no voltage is applied between the electrodes, to optical characteristics of the other section of the liquid crystal layer corresponding to the background, thereby providing a good positive display, that is, the formation of a colored display pattern distinctly discernible on a colorless or light-colored background.

14 Claims, 5 Drawing Figures

ELECTROOPTICAL DEVICE HAVING THINNER LIQUID CRYSTAL LAYER IN DISPLAY PORTIONS

FIELD OF THE INVENTION

This invention relates to an electrooptical device utilizing the guest-host effect, and more particularly to a guest-host liquid crystal display device employing a nematic liquid crystal having a positive dielectric anisotropy (hereinafter, this type of liquid crystal is referred to as Np liquid crystal).

DESCRIPTION OF THE PRIOR ART

The conventional guest-host liquid crystal display device of positive type, a type of forming a colored display pattern on a colorless or light-colored background, applies a colored-pattern forming technique which comprises arranging between a pair of electrode plates a layer of liquid crystal composition composed of a nematic liquid crystal with a negative dielectric anisotropy (hereinafter, this type of liquid crystal is referred to as Nn liquid crystal) aligned homeotropically as host material and a dichroic dye as guest material, and applying a voltage between a pair of electrodes laid separately on the pair of electrode plates. However, host Nn liquid crystals are inferior to Np liquid crystals in various characteristics such as the operational voltage, viscosity, nematic temperature range, and further in the order parameter of the dichroic dye used, so that a high contrast of coloration cannot be obtained with Nn liquid crystal. In view of the above, attempts have been made to perform a positive type of display by using a Np liquid crystal. Accordingly to these attempts, a liquid crystal composition in active areas can be aligned homogeneously to change its state from colored to colorless by applying a voltage thereto and a liquid crystal composition in non-active areas is kept colored by aligning homeotropically. This positive type of display method, however, has a disadvantage in that the complete colorless stae of display cannot be obtained by the voltage application.

The guest-host liquid crystal display device, although polarizing plates can be omitted and therefore the light transmittance can be increased correspondingly, has also a disadvantage in that the contrast between the colored and colorless areas cannot be enhanced. Thus, a technique has been proposed in recent year which utilizes the guest-host effect for a liquid crystal display mode wherein the liquid crystal assumes a cholesteric alignment in the "off state" (the state where no voltage is applied) and a nematic alignment in the "on state". According to this technique, a sufficiently high contrast between the colored state in the "on state" and that in the "off state" can be achieved.

In this technique, however, since the dichroic dye in the non-active areas is aligned according to a twisted structure of the cholesteric liquid crystal phase, the non-active areas are more colored than is necessary. This results in a disadvantage: for example, when a display device applying this technique is attached onto the focusing screen of a camera to utilize the technique for the superimposition in the finder, the image in the finder becomes dark.

Therefore, in the phase change type of guest-host liquid crystal display device, an attempt has been made to sufficiently reduce the color density of the non-active areas by making the cell thickness of the active areas different from that of the non-active areas, that is, by reducing adequately the cell thickness of the non-active areas. Nevertheless, the contrast cannot be improved enough to discern distinctly the display pattern.

SUMMARY OF THE INVENTION

An object of this invention is to provide a positive type of guest-host Np liquid crystal display device which shows a display pattern as distinct as in the case with the same type of display device employing a Np liquid crystal.

Another object of this invention is to provide an electrooptical device, particularly a liquid crystal display device, improved in the contrast between the colored and colorless areas in the off-state and the optical characteristics (e.g. the degree of coloration) of the active area is substantially equal to those of the non-active area in the off-state.

A further object of this invention is to provide a phase change type mode of liquid crystal display device, utilizing a novel guest-host effect, which can be used for the superimposition in the finder of a camera.

Other objects of this invention will be apparent for those ordinarily skilled in the art, from the following description.

DETAILED DESCRIPTION OF EMBODIMENTS OF THE INVENTION

The electrooptical device of this invention is a positive type of display device which has a layer of guest-host Np liquid crystal composition between a pair of electrode plates constructing the display device, at least one of the electrode plates being provided on its inner side with a display pattern of electrode which is coated with an insulating film treated for homogeneous alignment of the opposing liquid crystal (hereinafter, simply referred to as "treated for homogeneous alignment") and the remainder electrode-less area of said electrode plate being treated for homeotropic alignment. This display device is characterized in that the thickness of the liquid crystal layer facing the surface treated for homogeneous alignment is made thinner than that of the liquid crystal layer facing the surface treated for homeotropic alignment, whereby a colored display pattern corresponding to the display pattern of electrode can be formed in the "off state" on a colorless or light-colored background. Additionally, in the "on state", the thinner section of the liquid crystal layer in the "on state" has a light transmittance equivalent to that of the thickness section corresponding to the background, which is colorless or light-colored. Thus, an excellent contrast of display can be obtained in the "off state".

Figure 1A:
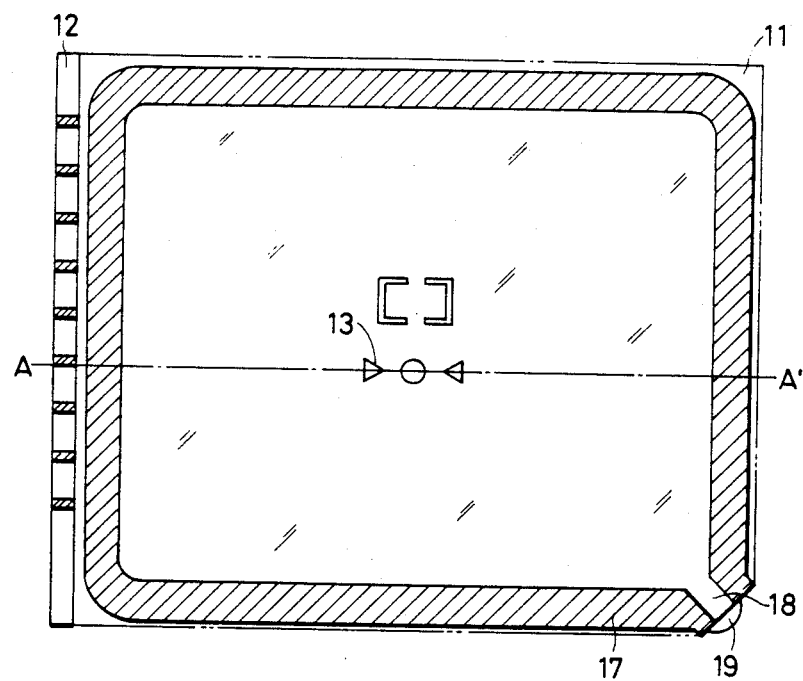
FIG. 1(A) is a plan view of the liquid crystal display device of this invention.
Figure 1B:
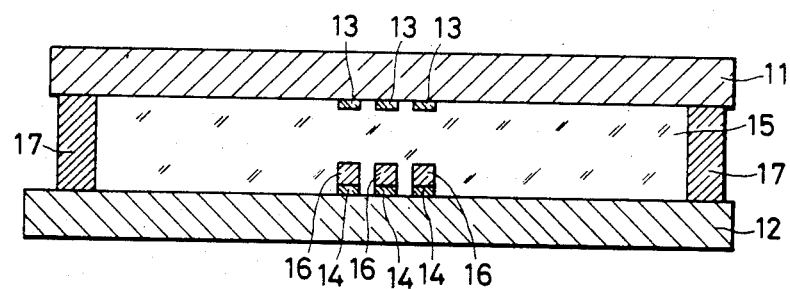
FIG. 1(B) is a cross-sectional view taken on line A—A' of FIG. 1(A).

FIG. 1(A) is a plan view of a liquid crystal display device of this invention which can be utilized for the superimposition is the finder of a camera. FIG. 1(B) is a cross-sectional view taken on line A—A' of FIG. 1(A).

These drawings show the arrangement of a liquid crystal composition layer 15 laid between upper and lower electrode plates, the upper electrode plate being constructed of an upper substrate 11 (e.g. glass or plastic plate) and electrodes 13 formed thereupon, and the lower electrode plate being constructed of a lower substrate 12 (e.g. glass or plastic plate) and electrodes 14 formed thereupon. The liquid crystal composition comprises a Np liquid crystal and a dichroic dye.

The electrodes 14 in the form of display pattern are laid at the prescribed position on the lower substrate 12 and entirely coated with clear insulating films 16.

The lower electrode plate can be prepared in the following way: (1) The substrate 12 supporting the display pattern of electrodes 14 is coated with, for instance, an agent for homeotropic alignment (e.g. a 1% isopropanol solution of SRX-675, a silane coupling agent, of Toray Inc.) by spinner coating at 6000 r.p.m. for 10 seconds and is heated at 150° C. for 3 minutes. (2) The homeotropic aligning coating is further coated with a solution of an ultraviolet ray-curable resin (e.g. FVR-15 of Fuji Chemicals Co., Ltd.) by spinner coating at 1000 r.p.m. for 20 seconds. The coating is dried at 60°–100° C. for 10 minutes to form a photosensitive layer 2–3μ thick. (3) The photosensitive layer is exposed through a prescribed pattern of mask (for masking the photosensitive layer on the area other than the area corresponding to the display pattern of electrodes 14) to ultraviolet rays at an intensity of 15–20 mW/cm² for 5 seconds to harden the prescribed region of the photosensitive layer. (4) The layer is treated with a developer and washed with a rinsing solution. The insulating films 16 obtained on the electrodes 14 are treated for homogeneous alignment, for example, by rubbing.

The thus prepared lower electrode plate having a structure as shown in FIG. 1(B) is combined with the upper electrode plate through a seal spacer 17 interposed between the plates to form a cell structure.

The Np liquid crystal composition is poured through an injection port 18 into the space between the electrode plates. The cell is sealed with a suitable sealant 19 to complete the intended liquid crystal display device. The cell thickness between the electrodes is desired to be 6–15μ approximately.

Figure 2:
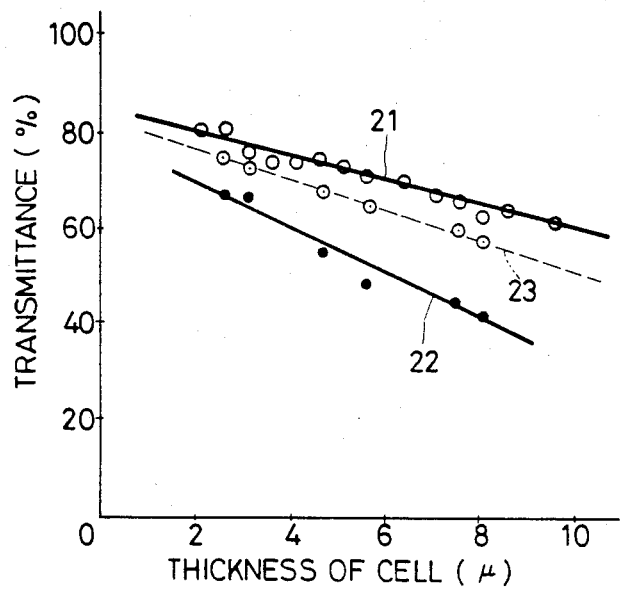
FIG. 2 is an illustration of relations between the light transmittance and the cell thickness.

FIG. 2 shows relations between the light transmittance (the degree of coloration) and the cell thickness in guest-host Np liquid crystal display devices.

The transmittance-thickness curve 21 shows the relationship between the transmittance and the thickness of the area homeotropically aligned, the curve 22 shows the relationship between the transmittance and the thickness of the area homogeneously aligned in the off-state, and the curve 23 shows the relationship between the transmittance and the thickness of the area homogeneously aligned in the on-state with an applied voltage of 6 V. For example, in such a display device having a uniform cell thickness of 8μ, the transmittance between the electrodes treated for homogeneous alignment is found to be about 42% in the "off state" from the transmittance-thickness curve 22 and about 58% in the "on state" with an applied voltage of 6 V from the curve 23, while the transmittance in the non-active area between the electrode-less surfaces of the upper and lower substrates treated for homeotropic alignment is found to be about 65% from the curve 21. Thus, the display pattern of this device, colored in the "off-state", can be distinguished upon applying the operational voltage; in other words, the display pattern on applying the operational voltage does not become so transparet as the background. It seems that the difference between the above-mentioned about 58% and about 65% is caused by the liquid crystal molecules on the surface of the substrate, which are not oriented to homeotropic alignment upon applying the voltage. Therefore, the transmittace of the active area in the "on state" is smaller than that of the transmittance of the area having Np liquid crystal of homeotropic alignment.

An embodiment of this invention is characterized in that the cell thickness in the active areas has been made thinner than the cell thickness in the non-active areas by forming an insulating film on electrodes, which is in the form of the display pattern, so that the active areas in the "on state" may exhibit the same transmittance as of the background areas (non-active areas). That is to say, since the cell thickness for a transmittance of about 65% is found to be about 5.5μ from the transmittance-thickness curve 23, the transmittance of the active areas in the "on state" can be made equivalent to that of the non-active areas by forming a 2.5-μ insulating film 16 on the electrodes 14 so as to give a cell thickness of about 5.5μ in the active areas (the areas facing the electrodes 14).

In this device, while the background areas have a transmittance of about 70%, the active areas in the "off state" exhibit a transmittance of about 40%, thereby being clearly discernible as a positive display; in the "on state", the active areas exhibit a transmittance of about 70%, equivalent to that of the background areas, thus looking to vanish completely.

Another embodiment of this invention is an electro-optical device having the following structure: The non-active areas of an electrode plate are convex, the entire surface of which is treated for homeotropic alignment; The active areas of the electrode plate are concave, the entire surface of which is treated for homogeneous alignment; This electrode plate is opposed with the counter electrode plate to form a cell structure, which is filled with a cholesteric-nematic phase change type of guest-host liquid crystal composition; Thus, the cell thickness in the non-active areas is less than that in the active areas.

Figure 3A:
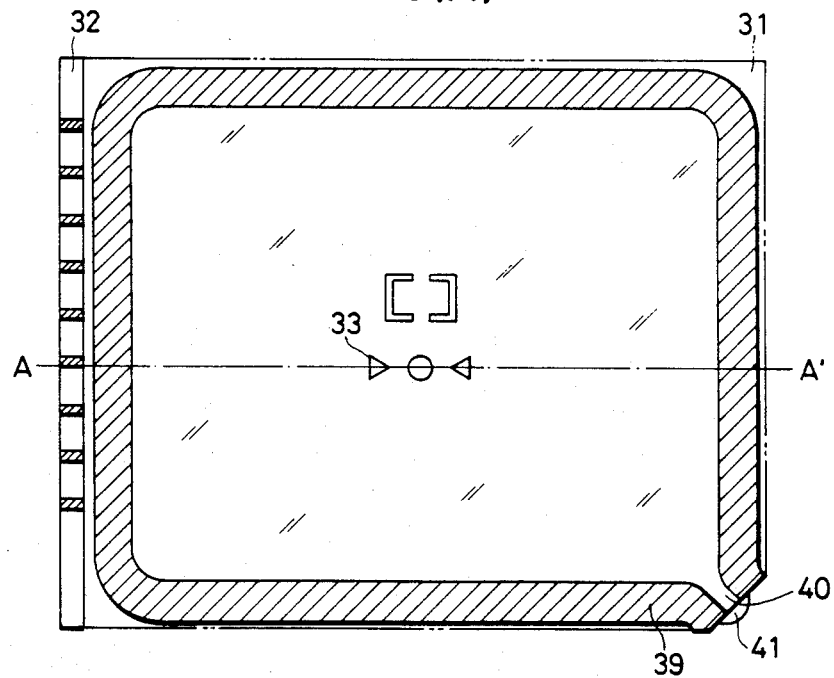
FIG. 3(A) is a plan view of another embodiment of this invention.
Figure 3B:
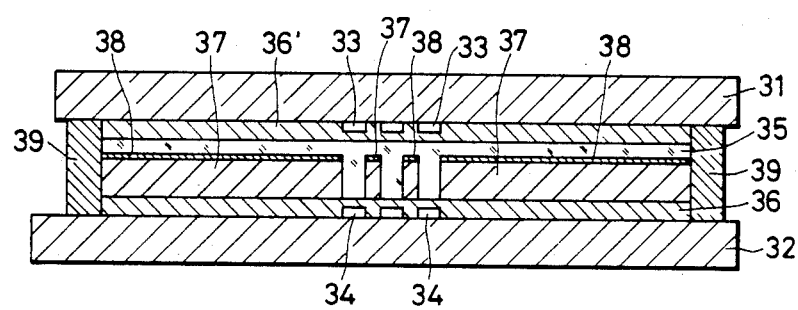
FIG. 3(B) is a cross-sectional view taken on line A—A' of FIG. 3(A).

FIG. 3(A) is a plan view of a liquid crystal display device of this invention which can be utilized for the superimposition in the finder of a camera. FIG. 3(B) is a cross-sectional view taken on line A—A' of FIG. 3(A).

These drawings show the arrangement of a liquid crystal layer 35 laid between upper and lower electrode plates, the former plate being constructed of an upper substrate 31 (e.g. glass or plastic plate) and electrodes 33 formed thereupon, and the latter plate being constructed of a lower substrate 32 (e.g. glass or plastic plate) and electrodes 34 formed thereupon. The liquid crystal composition is made of a cholesteric-nematic phase change type of liquid crystal and a dichroic dye.

The lower electrode plate, constructed of the lower substrate 32 and the electrodes 34 formed at a prescribed position on the substrate 32, is overlaid with an insulating film 36 treated for homogeneous alignment. The non-active areas of the insulating film 36, where no electrodes is formed, are further overlaid with a hardened resin layers 37 1–10μ thick, which is coated with films for homeotropic alignment 38.

The lower electrode plate can be prepared in the following way: (1) the substrate 32 supporting the display pattern of electrodes 34 is coated with an insulating film of, for example, polyimide, polyamide, SiO$_2$, or TiO$_2$ by the usual method. The insulating film surface is treated for homogeneous alignment by rubbing or some other method, (2) and then coated with a negative type of clear photosensitive resin composition such as FVR-15 (mfd; by Fuji Chemicals Co., Ltd.) or ammonium dichromate-containing gelatin or poly(vinyl alcohol) by spinner coating at 1000 r.p.m. for 10 seconds. The coating is dried at 50°–100° C. for 15 minutes to form a photosensitive layer about 1–10μ thick. (3) The photosensitive layer is irradiated with ultraviolet rays through a prescribed pattern of mask, (4) and coated with an agent for homeotropic alignment (FS-116, a fluorine-containing silane coupling agent of Daikin Co., Ltd.) by spinner coating. The coating is heated at 80°–150° C. for 10 minutes. (5) The layer is treated with a developer, rinsed, and heated at 80°–120° C. for about 1 hour, to form a homeotropic aligning film.

The hardened resin layer 37 can be formed to partly cover the electrodes 34. In this case, when a voltage is applied between the electrodes 34 partly covered with the resin and the counter electrodes 33, the orientation of liquid crystal molecules present in the region facing the resin-covered area of the electrodes 34 is little changed by applying the operational voltage, because the cell thickness in this region is enough as small as 1–5μ approximately. Accordingly, this area can be made a non-active area.

For the homeotropic alignment treatment in this invention, it is not always necessary to form such a film as stated above. The treatment can be accomplished, for instance, by applying the usual agent for homeotropic alignment (e.g. a homeotropic aligning surfactant). The homogeneous aligning treatment for the active area can be accomplished by not only the above stated rubbing of an insulating film but also other customary methods such as the slantwise vapor deposition of SiO$_2$.

The thus prepared lower electrode plate having a structure as shown in FIG. 3(B) is combined with the upper electrode plate through a seal spacer 39 interposed between the plates, to form a cell structure. Then, the above stated liquid crystal composition is poured through an injection port 40 into the space between the electrode plates. The cell is sealed with a suitable sealant 41 to complete the intended liquid crystal display device. The cell thickness between the electrodes is desired to be 6–15μ approximately.

An insulating film 36' similar to what is laid on the lower electrode plate can be formed on the inner side of the upper electrode plate to cover the substrate 31 and the electrode 33 is shown in FIG. 3(B). In this case, the insulating film 36' may be treated for homogeneous alignment.

Suitable Np liquid crystals for use in this invention are selected from Schiff's salt group, ester group, azo group, azoxy group, and biphenyl group liquid crystal compounds. Typical examples thereof are listed below.

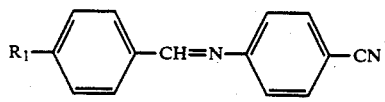

wherein R$_1$:
$C_nH_{2n+1}COO-$   $2 \leq n \leq 8$
$C_nH_{2n+1}-$   $2 \leq n \leq 8$
$C_nH_{2n+1}O-$   $3 \leq n \leq 8$

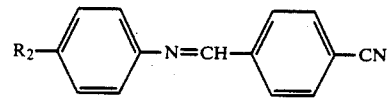

wherein R$_2$:
$C_nH_{2n+1}-$   $1 \leq n \leq 8$
$C_nH_{2n+1}O-$   $1 \leq n \leq 8$

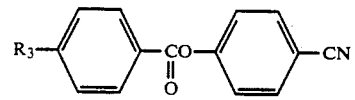

wherein R$_3$:
$C_nH_{2n+1}-$   $4 \leq n \leq 9$
$C_nH_{2n+1}O-$   $5 \leq n \leq 9$
$C_nH_{2n+1}COO-$   $4 \leq n \leq 7$
$C_nH_{2n+1}OCOO-$   $5 \leq n \leq 7$

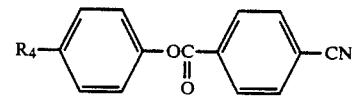

wherein R$_4$:
$C_nH_{2n+1}-$   $4 \leq n \leq 8$
$C_nH_{2n+1}O-$   $5 \leq n \leq 8$

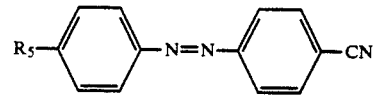

wherein

R$_5$: $C_nH_{2n+1}-$
$C_nH_{2n+1}O-$      $4 \leq n \leq 9$
$C_nH_{2n+1}COO-$

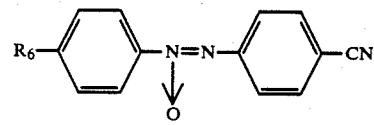

wherein

R$_6$: $C_nH_{2n+1}-$
$C_nH_{2n+1}O-$
$C_nH_{2n+1}COO-$      $4 \leq n \leq 9$
$C_nH_{2n+1}OCOO-$

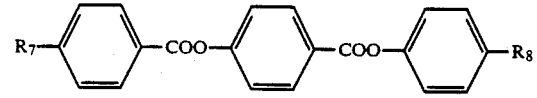

wherein

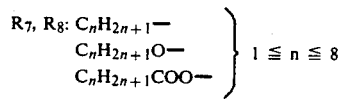

wherein $R_{11}$: $C_nH_{2n+1}$— $4 \leq n \leq 8$

These liquid crystal compounds may be used not only in single form but also in mixture suitably selected for the purpose of achieving desirable electrooptical properties, nematic liquid crystal temperature range, service life, etc. Nn liquid crystal compounds can also be incorporated.

Typical examples of dichroic dyes suitable for use in this invention are as follows:

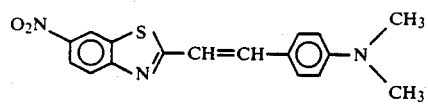

1

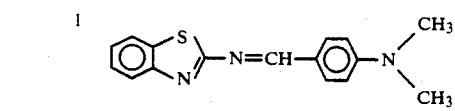

2

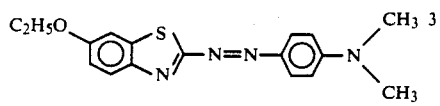

3

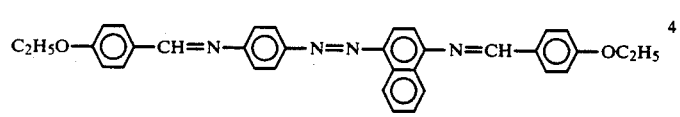

4

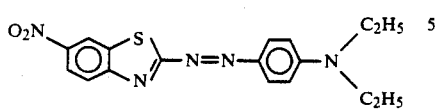

5

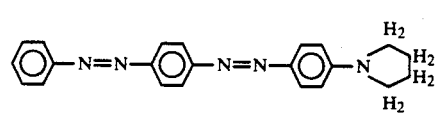

6

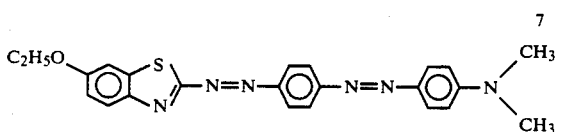

7

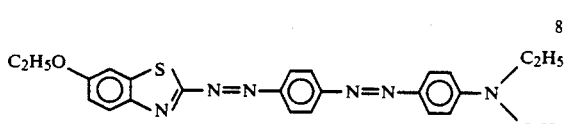

8

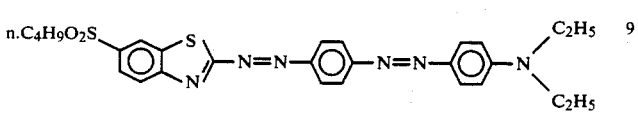

9

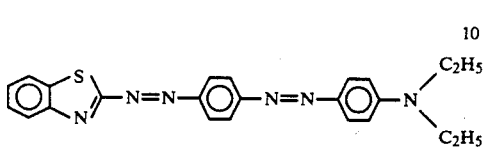

10

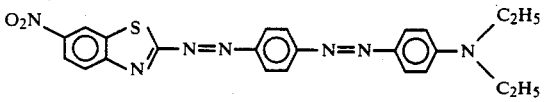

11

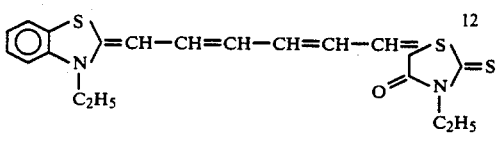

12

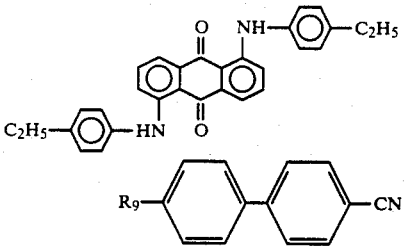

13

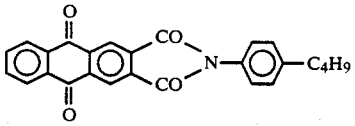

14

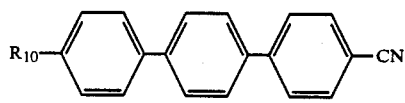

wherein $R_9$: $C_nH_{2n+1}$— $4 \leq n \leq 9$

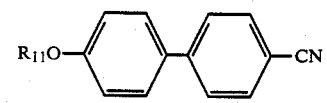

wherein $R_{10}$: $C_nH_{2n+1}$— $4 \leq n \leq 8$

Another embodiment of this invention is a cholesteric-nematic phase change type of guest-host liquid crystal display device employing a solution of the above-cited dichroic dye in the above-cited Np liquid crystal compound, the solution containing a suitable amount of an optical-active substance. Such optical-active substances include cholesteryl compounds, e.g. cholesteryl chloride, cholesteryl bromide, cholesteryl iodide, cholesteryl formate, and cholesteryl acetate and chiral nematic liquid crystal compounds, e.g. the following:

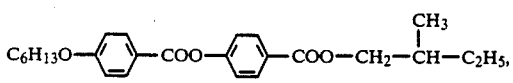

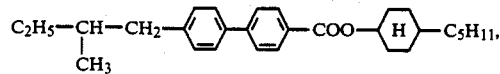

-continued

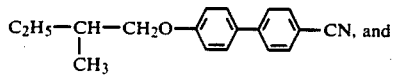

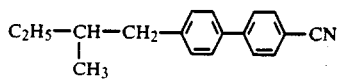

The cholesteric-nematic phase change type of liquid crystal used in this invention can be prepared by adding one of these optical-active substances in amounts of 0.5–10% by weight to the above-cited Np liquid crystal compound.

The insulating film in the liquid crystal display device of this invention can be formed from the following materials besides the above-mentioned photosensitive resins such as FVR-15 and ammonium dichromate-containing gelatin or poly(vinyl alcohol): Oily photosensitive resin solutions prepared by mixing polymers, e.g. poly(vinyl cinnamate), cyclized polyisoprene, neoprene rubber, and cyclized rubber with an azide compound, as sensitizer, e.g. p-phenylen bisazide, 4,4'-diazidebenzophenone, 4,4'-diazidedipheylmethane, 4,4'-diazidedipheyl sulfide, or 4,4'-diazidestilbene.

As examples of such materials commercially available, there may be cited ODUR-100WR, ODUR-120, ODUR-1010, ODUR-1013, and ODUR-1014, which are farultraviolet ray-curable resin solutions made by Tokyo Oka Co., Ltd. and OMR-85, which is an ultraviolet ray-curable resin solution made by said company.

The liquid crystal display device of this invention can operate in either the static driving mode or the dynamic driving mode with either the segment form display mode or the matrix form display mode.

According to this invention, the light transmittance of the active areas can be made equivalent to that of the non-active areas when applying the operational voltage; thus the positive display pattern looks completely colorless in the "on state". In addition, the light transmittance of the non-active areas and the color contrast between the active areas and the non-active areas can be made sufficiently high, whereby the contrast of display can be improved.

What we claim is:

1. An electrooptical device having a dichroic dye-containing nematic liquid crystal layer between a pair of electrode plates, said liquid crystal having a positive dielectric anisotropy, which is characterized in that;
at least one of said pair of electrode plates has a surface of electrodes formed in a pattern, which is treated for homogeneous alignment, and another surface treated for homeotropic alignment on the electrode-less area of said electrode plate, and the thickness of the section of the liquid crystal layer laid between the display pattern of electrodes and the counter electrodes, wherein the liquid crystal is controlled selectively in either a colored state or a colorless or light-colored state by applying or not applying a voltage between the electrodes, is made thinner than the thickness of the other section of the liquid crystal layer, which is not interposed between the electrodes and corresponds to the background of the display pattern, by the thickness of a photo-cured photosensitive resin which is formed corresponding to said section of the liquid crystal layer laid between the display pattern of electrodes and the counter electrodes.

2. The electrooptical device of claim 1, wherein said surface treated for homogeneous alignment is a surface of film of a photo-cured photosensitive resin.

3. The electroopcatical device of claim 1, wherein the transmittance of the section of the liquid crystal layer laid between the electrodes, when a voltage is applied between the electrodes, is substantially equal to the transmittance of the other section of the liquid crystal layer.

4. The electrooptical device of claim 1, wherein the liquid crystal layer colorless or light-colored when a voltage is applied between the electrodes turns into colored optical-characteristics on removing the voltage.

5. An electrooptical device having a cholesteric-nematic phase change type of liquid crystal layer between a pair of electrode plates, said layer comprising a dichroic dye optical-active substance, and nematic liquid crystal compound having a positive dielectric anisotropy, which is characterized in that the thickness of the section of the liquid crystal layer laid between a pair of electrodes, wherein the liquid crystal is controlled selectively in either a colored state or a colorless or light-colored state by applying or not applying a voltage between the electrodes, is made thicker than the thickness of the other section of the liquid crystal layer, which is not interposed between the electrodes and corresponds to the background of the display pattern, by the thickness of a photo-cured photosensitive resin which is formed corresponding to said section of the liquid crystal layer laid between the display pattern of electrodes and the counter electrodes.

6. The electrooptical device of claim 5, wherein those areas of the pair of electrode plates which face the thicker liquid crystal layer are treated for homogeneous alignment and those areas of the electrode plates which face the thinner liquid crystal layer are treated for homeotropic alignment.

7. The electrooptical device of claim 6, wherein those areas of the electrode plates, which are treated for homogeneous alignment, are coated each with an insulating film.

8. The electrooptical device of claim 7, wherein said insulating film comprises an organic resin or inorganic insulating compound.

9. The electrooptical device of claim 8, wherein said insulating film comprises a polyimide or polyamide resin.

10. The electrooptical device of claim 5, wherein said photocured photosensitive resin comprises poly(vinyl alcohol).

11. The electrooptical device of claim 5, wherein said optical-active substance is contained in amounts of 0.5–10% by weight in the liquid crystal layer.

12. The electrooptical device of claim 11, wherein said optical-active substance is a cholesteryl compound or a chiral nematic liquid crystal compound.

13. The electrooptical device of claim 5, wherein the transmittance of the section of the liquid crystal layer laid between the electrodes, when a voltage is applied between the electrodes is substantially equal to the transmittance of the other section of the liquid crystal layer.

14. The electrooptical device of claim 5, wherein the liquid crystal layer colorless or light-colored when a voltage is applied between the electrodes turns into colored optical-characteristics on removing the voltage.

* * * * *

UNITED STATES PATENT AND TRADEMARK OFFICE
CERTIFICATE OF CORRECTION

PATENT NO. : 4,572,617

DATED : FEBRUARY 25, 1986

INVENTOR(S) : YUICHI MASAKI, ET AL.

Page 1 of 2

It is certified that error appears in the above-identified patent and that said Letters Patent is hereby corrected as shown below:

COLUMN 6

Line 42 to 45, "wherein $R_5: C_nH_{2n+1}-$" should read --wherein $R_5: C_nH_{2n+1}-$--.

Line 56 to 59, "wherein $R_6: C_nH_{2n+1}-$" should read --wherein $R_6: C_nH_{2n+1}-$--.

COLUMN 9

Line 25, "p-phenylen" should read --p-phenylene--.
Line 26, "4,4'-diazidedipheylmethane," should read --4,4'-diazidediphenylmethane--.
Line 26 to 27, "4,4'-diazidedipheyl," should read --4,4'-diazidediphenyl--.
Line 31, "farultraviolet" should read --far-ultraviolet--.

UNITED STATES PATENT AND TRADEMARK OFFICE
CERTIFICATE OF CORRECTION

PATENT NO. : 4,572,617

DATED : FEBRUARY 25, 1986

INVENTOR(S) : YUICHI MASAKI, MAKOTO OGUA

It is certified that error appears in the above-identified patent and that said Letters Patent is hereby corrected as shown below:

COLUMN 10

Line 6, "electroopcatical" should read --electrooptical--.

Signed and Sealed this

Twenty-fourth Day of March, 1987

Attest:

DONALD J. QUIGG

Attesting Officer     Commissioner of Patents and Trademarks